(12) United States Patent
Ishiguro

(10) Patent No.: US 9,481,549 B2
(45) Date of Patent: Nov. 1, 2016

(54) REGENERATIVE ELECTRIC POWER STORAGE CONTROL SYSTEM FOR ELEVATORS

(75) Inventor: Hidetaka Ishiguro, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 414 days.

(21) Appl. No.: 14/348,714

(22) PCT Filed: Oct. 18, 2011

(86) PCT No.: PCT/JP2011/005804
§ 371 (c)(1),
(2), (4) Date: Mar. 31, 2014

(87) PCT Pub. No.: WO2013/057750
PCT Pub. Date: Apr. 25, 2013

(65) Prior Publication Data
US 2014/0238782 A1 Aug. 28, 2014

(51) Int. Cl.
*B66B 1/06* (2006.01)
*B66B 1/30* (2006.01)
*H02J 7/34* (2006.01)

(52) U.S. Cl.
CPC ............. *B66B 1/302* (2013.01); *H02J 7/345* (2013.01)

(58) Field of Classification Search
CPC .................. B66B 1/302; H02J 7/345
USPC .............. 187/289, 290, 396, 397, 391, 393; 318/375, 376, 799–815; 307/66, 69; 320/128, 132, 134, 135, 136, 143, 144
See application file for complete search history.

(56) References Cited

U.S. PATENT DOCUMENTS

| 6,435,311 B2 * | 8/2002 | Araki ............................. 187/290 |
| 6,457,565 B2 * | 10/2002 | Tominaga ................. B66B 1/30 |
| | | 187/290 |

(Continued)

FOREIGN PATENT DOCUMENTS

| CN | 1309076 A | 8/2001 |
| CN | 1353081 A | 6/2002 |

(Continued)

OTHER PUBLICATIONS

Office Action issued Nov. 25, 2014 in Japanese Patent Application No. 2013-539404 (with English language translation).

(Continued)

*Primary Examiner* — Anthony Salata
(74) *Attorney, Agent, or Firm* — Oblon, McClelland, Maier & Neustadt, L.L.P.

(57) ABSTRACT

A regenerative electric power storage control system for elevators, including: a converter that converts AC electric power to DC electric power; an inverter that converts the DC electric power to the AC electric power, and drives an electric motor that ascends and descends a car; an electric power storage apparatus provided, via an electric power charge and discharge unit, across DC buses located between the converter and the inverter; an electric power charge and discharge control unit to which DC electric power is supplied from an electric power charge and discharge control power supply and that controls the charge and discharge unit. The charge and discharge control unit calculates on a time zone basis electrical energy stored in and electrical energy discharged from the energy storage apparatus during a predetermined period, and based on the calculation result, determines a discharge operation for each time zone posterior to the predetermined period.

10 Claims, 2 Drawing Sheets

(56) References Cited

U.S. PATENT DOCUMENTS

| | | | | |
|---|---|---|---|---|
| 6,460,658 B2* | 10/2002 | Suga | ......................... | B66B 1/30 187/290 |
| 6,471,013 B2* | 10/2002 | Banno | ....................... | B66B 1/30 187/290 |
| 6,732,838 B1* | 5/2004 | Okada | ....................... | B66B 1/30 187/290 |
| 6,938,733 B2* | 9/2005 | Eilinger | .................. | B66B 5/027 187/290 |
| 7,331,426 B2* | 2/2008 | Jahkonen | .................. | B66B 1/30 187/290 |
| 8,146,714 B2* | 4/2012 | Blasko | ....................... | B66B 1/30 187/290 |
| 8,172,042 B2* | 5/2012 | Wesson | .................. | B66B 1/308 187/290 |
| 8,177,033 B2* | 5/2012 | Kauppinen | ............... | B66B 1/30 187/290 |
| 8,590,672 B2* | 11/2013 | Oggianu | ................. | B66B 1/302 187/290 |
| 8,616,338 B2* | 12/2013 | Veronesi | ................. | B66B 1/302 187/290 |
| 8,887,872 B2* | 11/2014 | Chen | .................. | G01R 31/3651 187/290 |
| 2001/0013447 A1 | 8/2001 | Araki et al. | | |
| 2002/0053490 A1 | 5/2002 | Banno et al. | | |

FOREIGN PATENT DOCUMENTS

| | | |
|---|---|---|
| CN | 1696036 A | 11/2005 |
| CN | 102101615 A | 6/2011 |
| JP | 2002 145543 | 5/2002 |
| JP | 2005 324884 | 11/2005 |
| JP | 2005 324903 | 11/2005 |
| JP | 2011 126691 | 6/2011 |

OTHER PUBLICATIONS

International Search Repot Issued Jan. 24, 2012 in PCT/JP11/005804 Filed Oct. 18, 2011.

Combined Chinese Office Action and Search Report issued Nov. 27, 2014 in Patent Application No. 201180074150.1 (with English Translation and English Translation of Category of Cited Documents).

* cited by examiner

REGENERATIVE ELECTRIC POWER STORAGE CONTROL SYSTEM FOR ELEVATORS

TECHNICAL FIELD

The present invention relates to a regenerative electric power storage control system for elevators where a regenerative electric power storage apparatus is included.

BACKGROUND ARTS

A conventional regenerative electric power storage control system for elevators includes a converter that converts AC electric power from a utility power source to DC electric power by rectifying the AC electric power; an inverter that converts the DC electric power from the converter to variable voltage and variable frequency AC electric power, to supply the converted electric power to an electric motor and operate an elevator; electrical energy storage means that stores, during a regenerative operation of the elevator, DC energy that is supplied from DC buses between the converter and the inverter, and that supplies, during a motoring operation of the elevator, to the DC buses the stored DC energy; electric power charge and discharge means disposed between the energy storage means and the DC buses, the charge and discharge means discharging energy from the energy storage means to the DC buses and storing in the energy storage means, electric power from the DC buses; and an electric power charge and discharge control unit that controls the charge and discharge means.

Further, a technique for enhancing the energy conservation effect has been proposed in, for example, Patent Document 1 in which standby status recognition means is provided which recognizes that an elevator is on standby, and when the recognition means recognizes a standby status of the elevator, an electric power charge and discharge control unit is controlled to reduce its power consumption and thereby reduce the standby power consumption of the charge and discharge control unit.

RELATED ARTS

Patent Document

Patent Document 1 JP-A-2005-324903

SUMMARY OF THE INVENTION

Problems that the Invention is to Solve

It has been found, however, that because when the elevator is operated at a low frequency to an extent such that the elevator car is not determined to be on standby, a regenerative electric power storage control system of a conventional elevator cannot reduce standby power consumption of an electric power charge and discharge control unit and the self-discharge of electric power storage means increases, the control system has not been able to make full use of stored electric power.

The present invention is directed to overcome the above problem, and the object of the invention is to provide a regenerative electric power storage control system for elevators, capable of reducing electrical energy to be lost through self-discharge and of thereby enhancing the energy conservation effect, in a time zone where the elevator is operated at a low frequency and the degree of self-discharge increases.

Means for Solving the Problems

A regenerative electric power storage control system for elevators, according to the present invention includes a converter that converts alternating current (AC) electric power to direct current (DC) electric power; an inverter that converts the DC electric power to AC electric power, to drive an electric motor that causes a car to ascend and descend; electrical energy storage means provided, via electric power charge and discharge means, across DC buses located between the converter and the inverter, the energy storage means storing, during a regenerative operation of the car, DC energy that is supplied from the DC buses and supplying the DC energy to the DC buses during a motoring operation of the car; an electric power charge and discharge control unit that calculates electrical energy that is stored during the regenerative operation of the car in the energy storage means, and electrical energy that is supplied from the energy storage means to the DC buses during the motoring operation of the car, and then controls the electric power charge and discharge means; an electric power charge and discharge control power supply that supplies power to the charge and discharge unit; and voltage conversion means that supplies energy of the energy storage means to the charge and discharge control power supply, wherein the charge and discharge control unit calculates, on a time zone basis, electrical energy stored in and discharged from the energy storage means during a predetermined period, and in a time zone where after the predetermined period, a value derived by subtracting the discharged electrical energy of the energy storage means from the stored electrical energy thereof is a predetermined value or greater, the control unit supplies the energy stored in the energy storage means to the DC buses and to the charge and discharge control power supply.

Advantageous Effects of the Invention

A regenerative electric power storage control system for elevators, configured as above, calculates on a time zone basis electrical energy stored in and discharged from energy storage means in a period predetermined by an electric power charge and discharge control unit and determines, based on the calculation result, an operation of the charge and discharge control unit for each time zone posterior to the predetermined period, and in a time zone where a car is operated at a low frequency and the degree of self-discharge of the energy storage means is calculated to increase, energy of the energy storage means is supplied to the DC buses and also to a charge and discharge control power supply, and thereby energy to be lost through the self-discharge can be reduced, thus enhancing the energy conservation effect.

MODE FOR CARRYING OUT THE INVENTION

Embodiment 1

Figure 1:
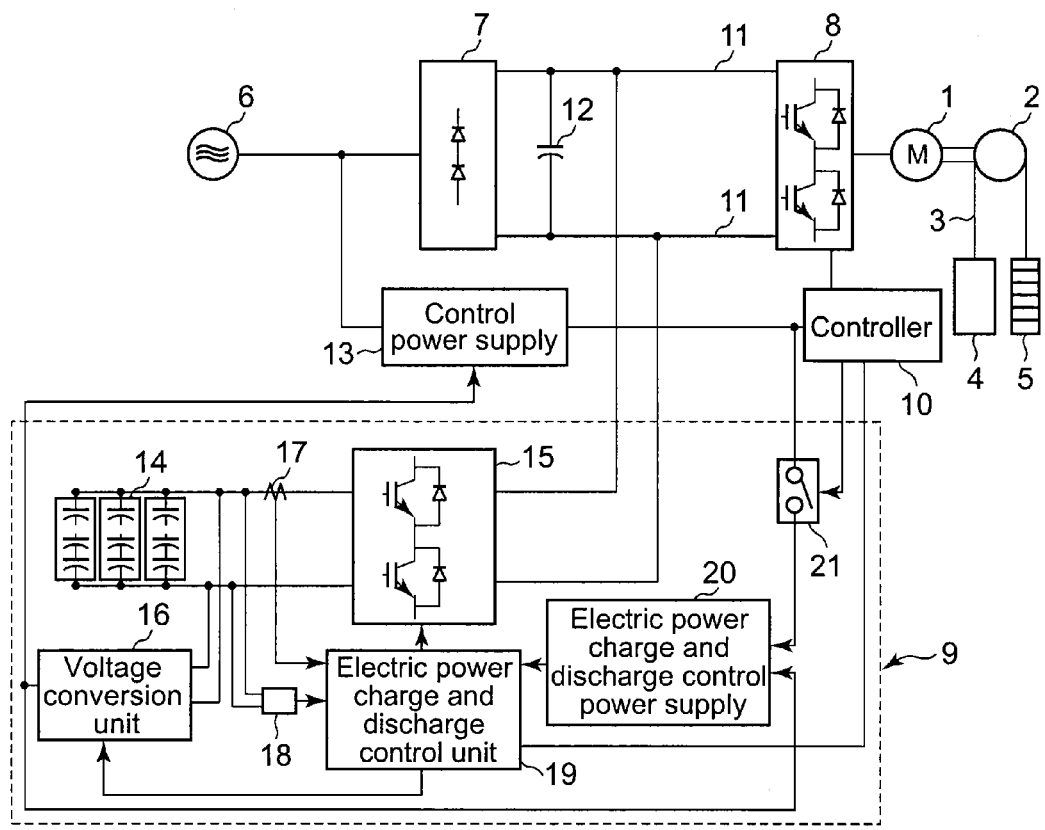
FIG. 1 is a schematic diagram showing a configuration of a regenerative electric power storage control system for elevators, according to Embodiment 1 of the present invention.

One embodiment according to the present invention will now be described in detail with reference to the drawings. FIG. 1 is a schematic diagram showing a configuration of a regenerative electric power storage control system for elevators, according to one embodiment of the present invention.

Referring to FIG. 1, the elevator includes an electric motor 1, a traction machine 2 coupled to a rotation axis of the electric motor 1, a rope 3 engaged with the traction machine 2, a car 4 suspended from one end of the rope 3, and a counterweight 5 suspended from the other end thereof. Rotation of the electric motor 1 causes the car 4 and the counterweight 5 to ascend and descend.

The regenerative electric power storage control system for elevators includes a converter 7 that converts alternating current (AC) electric power of a utility power source 6 to direct current (DC) electric power; an inverter 8 that converts the DC electric power to variable voltage and variable frequency AC electric power, to drive the electric motor 1; an electric power storage apparatus 9 that stores and discharges electric power for driving the electric motor 1; and a controller 10 that provides operational control of the car 4.

The converter 7, which is made up of devices such as diodes, converts the AC electric power of the utility power source 6 to the DC electric power, and delivers its output power to DC buses 11. Connected across the DC buses 11 is a capacitor 12 that smoothes ripple components of the DC electric power.

The inverter 8, which is made up of transistors and insulated gate bipolar transistors (IGBTs), converts the DC electric power of the DC buses 11 to variable voltage and variable frequency AC electric power, to drive the motor 1.

The controller 10, to which DC electric power is supplied from a control power supply 13 that converts the AC electric power of the utility power source 6 to the DC electric power, manages and controls the entire elevator system. The controller generates startup and stop commands for the car 4 and position and speed commands for the car 4, to deliver such command signals to the inverter 8. Further, during operation of the car 4, the controller also controls the electric power storage apparatus 9 according to a regenerative operation and a motoring operation.

The electric power storage apparatus 9 includes an electric double-layer capacitor (EDLC) 14 serving as energy storage means; an electric power charge and discharge unit 15 provided between the DC buses 11 and the EDLC 14, the charge and discharge unit serving as charge and discharge means configured of a device such as a DC-DC converter that regulates voltage during charge and discharge; a voltage conversion unit 16 serving as voltage conversion means that supplies energy of the EDLC 14 to the control power supply 13 and an electric power charge and discharge control power supply 20; a current measuring device 17 that measures charge and discharge current of the EDLC 14; a voltage measuring device 18 that measures voltage across the EDLC 14; and an electric power charge and discharge control unit 19.

The electric power charge and discharge control unit 19, receiving values measured with the current measuring device 17 and the voltage measuring device 18, calculates electrical energy stored in and discharged from the EDLC 14, and then controls the electric power charge and discharge unit 15 and the voltage conversion unit 16. The electric power charge and discharge control power supply 20, which supplies DC electric power to the charge and discharge control unit 19, receives the DC electrical energy/power from both the EDLC 14 via the voltage conversion unit 16 and the control power supply 13 via a switch 21.

Operation of the regenerative electric power storage control system for elevators, configured as described above, will be described with reference to FIGS. 1 through 4. During the regenerative operation of the car 4, the controller 10 issues a charge command to the charge and discharge control unit 19, which in turn controls the charge and discharge unit 15 so that it charges the EDLC 14 with electric power from the DC buses 11. In contrast to this, in the motoring operation of the car 4, the controller 10 issues a discharge command to the charge and discharge control unit 19, which in turn controls the charge and discharge unit 15 so that it discharges the energy stored in the EDLC 14 to the DC buses 11.

Figure 2:
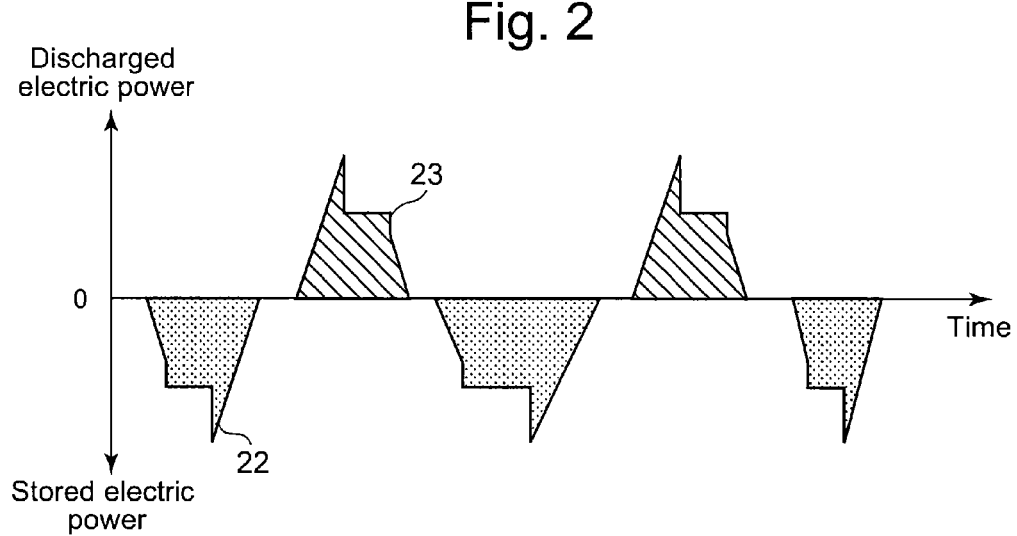
FIG. 2 is a graphical representation showing electric power stored and discharged when a car is operated at a high frequency, according to Embodiment 1 of the present invention.

FIG. 2 is a graphical representation showing electric power stored in and discharged from the EDLC 14 when the car 4 is operated at a high frequency, according to one embodiment of the present invention. Referring to FIG. 2, the vertical axis and the horizontal axis represent electric power and time, respectively. Here, in terms of the orientation of a current value, the direction in which energy is discharged from the EDLC 14 is assumed positive. Portions above zero on the vertical axis represent discharged electric power 23, and portions below zero thereon, stored electric power 22. Instantaneous values of the discharged electric power 23 and the stored electric power 22 can be calculated by the product of current and voltage values measured with the current measuring device 17 and the voltage measuring device 18, respectively.

When the car 4 is operated at a high frequency, the electric power stored during the regenerative operation is immediately discharged during the motoring operation; thus, the EDLC 14 has a low energy loss due to self-discharge with respect to the stored electric power, providing energy efficient operation.

Figure 3:
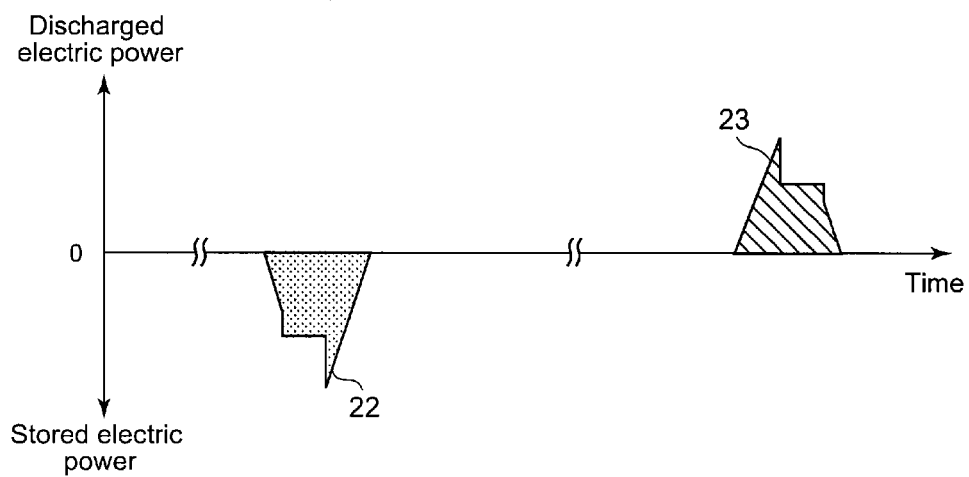
FIG. 3 is a graphical representation showing electric power stored and discharged when the car is operated at a low frequency, according to Embodiment 1 of the present invention.

FIG. 3 is a graphical representation showing electric power stored in and discharged from the EDLC 14 when the car 4 is operated at a low frequency, according to one embodiment of the present invention. Note that in FIG. 3, the same portions as those in FIG. 2 are designated by the same reference numerals, and the description of representation in common between this figure and FIG. 2 will not be provided herein.

When the car 4 is operated at the low frequency, the electric power stored during the regenerative operation is not used for some time; thus, during that time, some of the energy is lost from the EDLC 14 because of the self discharge. Accordingly, electric power that can be discharged during the motoring operation is reduced, causing the decreased energy efficiency.

A repetitive unit period such as day, week, month, season or year, is assumed to be a predetermined period, and a learning period is assumed to be a given unit period at an early time after an elevator is set up. The charge and discharge control unit 19 measures electrical energy that is stored in the EDLC 14 through the regenerative operation of the car 4, and electrical energy that is discharged from the EDLC 14 through the motoring operation thereof, on a predetermined time zone basis, the zone being contained in the learning period. The predetermined time zone can be assumed to be a time zone such as 1 min., 5 min., 10 min., 30 min., 2 hr., or 3 hr.—that is repeated during the learning period.

Figure 4:
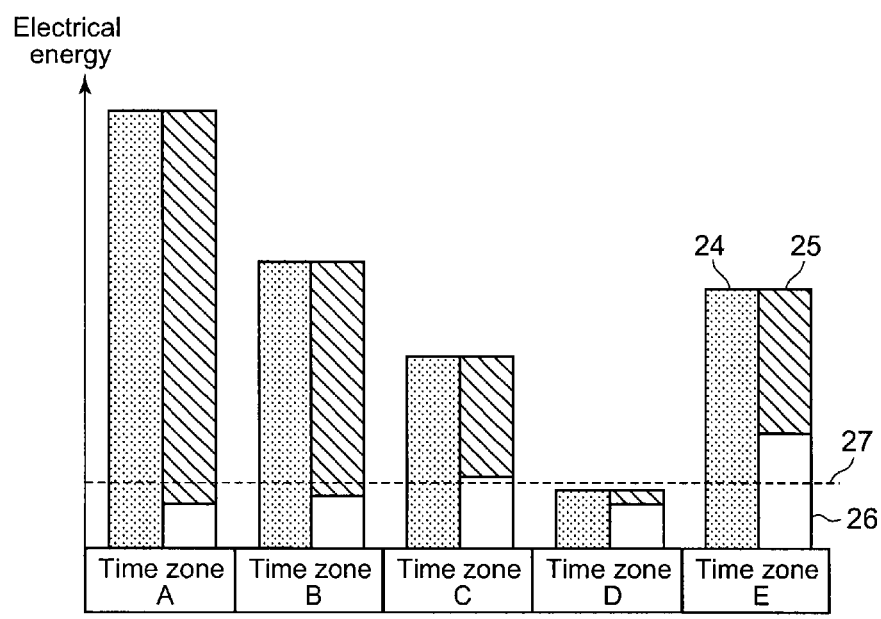
FIG. 4 is a graphical representation showing electrical energy stored and discharged on a time zone basis during a learning period, according to Embodiment 1 of the present invention.

FIG. 4 is a graphical representation showing electrical energy on a time zone basis stored in and discharged from the EDLC 14, the energy being calculated during the learning period, according to one embodiment of the present invention. The vertical and horizontal axes represent electrical energy, and time zones, respectively. The time zones are classified into five, and there is shown stored electrical energy 24 and discharged electrical energy 25 in each time zone. The stored electrical energy 24 and the discharged electrical energy 25 can be calculated by evaluating the integral of the stored electric power 22 and that of the discharged electric power 23, respectively. A value derived by subtracting the discharged electrical energy 25 from the stored electrical energy 24 is unused electrical energy 26. This value includes, in addition to the energy loss due to self-discharge of the EDLC 14, electrical energy that has not been able to be fully consumed during a motoring operation because of a low frequency of the motoring operation in comparison with that of a regenerative operation.

A reference value 27, as shown in a dotted line of FIG. 4, is a value pre-calculated for determining an operation mode posterior to the learning period, and can be assumed to be, for example, a value derived by adding to power consumption for each time zone of the control power supply 20, electrical energy that is lost through a conversion performed by the voltage conversion unit 16 when the electric power of the EDLC 14 is supplied to the control power supply 20. In this instance, the reference value 27 represents electrical energy required for the EDLC 14 to provide electrical energy to the control power supply 20 for operating the charge and discharge control unit 19.

By comparing with the reference value 27 the unused electrical energy 26 for each time zone calculated during the learning period, the charge and discharge control unit 19 divides into three types the operation mode for each time zone at the time of the actual car operation after the learning period, to thereby perform the control operation.

(1) In a time zone(s) where the stored electrical energy 24 is equal to or greater than the reference value 27 serving as a threshold value, and the unused electrical energy 26 is equal to or greater than the reference value 27 serving as a predetermined value, energy of the EDLC 14 is supplied via the charge and discharge unit 15 to the DC buses 11 and is also supplied to the control power supply 20 via the voltage conversion unit 16.

(2) In a time zone(s) where the stored electrical energy 24 is the reference value 27 or greater and the unused electrical energy 26 is less than the reference value 27, energy of the EDLC 14 is supplied via the charge and discharge unit 15 to the DC buses 11 alone.

(3) In a time zone(s) where the stored electrical energy 24 is less than the reference value 27, no energy of the EDLC 14 is supplied via the charge and discharge unit 15 to the DC buses 11 and to the control power supply 20 via the voltage conversion unit 16, to deactivate the electric power storage apparatus 9.

In FIG. 4, a time zone A is one where the car 4 is operated at a high frequency, and a time zone B is one where the car 4 is operated at a relatively high frequency. The stored electrical energy 24 during a regenerative operation is chiefly consumed as the discharged electrical energy 25 during a motoring operation. Since the unused electrical energy 26 is small, the energy of the EDLC 14 is supplied via the charge and discharge unit 15 to the DC buses 11 alone (Mode (2)).

In FIG. 4, a time zone C is one where the car 4 is operated at a low frequency and the energy loss due to self-discharge increases with respect to the stored electrical energy 24. Energy to be essentially lost through the self-discharge is supplied via the voltage conversion unit 16 to the control power supply 20, thereby reducing the actual energy loss due to the self-discharge. This enables stored energy, before being reduced through the self-discharge, to be supplied to the control power supply 20; thus, the unused electrical energy 26 of the EDLC 14 can be used effectively (Mode (1)).

In FIG. 4, a time zone D is one that is lower in frequency of the car 4 operation than the time zone C. In this instance, the stored electrical energy 24 is small and less than the reference value 27. In this way, when the frequency of the car 4 operation is extremely low, standby electrical energy for causing the storage apparatus 9 to be on standby when the car 4 is not in operation, is greater than the stored electrical energy 24 to be generated by the regenerative operation, so that the energy conservation effect is lost which results from the use of the storage apparatus 9, and contrarily the power consumption increases. Thus, when the stored electrical energy 24 is less than the reference value 27, the operation of the storage apparatus 9 is deactivated, thereby reducing the power consumption in the entire regenerative power storage control system for elevators (Mode (3)).

In FIG. 4, a time zone E is one where the car 4 is operated at a relatively high frequency. Shown therein is an example where the rate of a motoring operation is lower than that of a regenerative operation. This represents a time zone where the rate of the regenerative operation increases, the regenerative operation being such that, as in the quitting time in an office building, the car 4 moves down, with a full capacity of passengers on board, from an upper floor to the first floor and thereafter moves up with no passengers on board from the first floor to an upper floor. In this way, in time zones where the unused electrical energy 26 is the reference value 27 or greater even if the frequency of the car operation is high, the unused electrical energy is supplied to the charge and discharge control power supply 20 and thereby the unused electrical energy 26 of the EDLC 14 can effectively be utilized (Mode (1)).

In the operation mode (1), while the energy of the EDLC 14 is supplied via the voltage conversion unit 16 to the charge and discharge control power supply 20, the electric power thereof may also be supplied via the voltage conversion unit 16 to the control power supply 13. Supplying the energy of the capacitor to the control power supply 13 can further enhance the energy conservation effect when the unused electrical energy 26 is great.

Specific operation will next be described in which after, during a learning period, an operation mode for each time zone has been determined out of the modes (1) through (3), the process moves to the operation mode for each time zone at the time of the actual car operation posterior to the learning period.

The charge and discharge control unit 19, which has determined out of the operation modes (1) through (3) the operation mode for each time zone during the learning period, stores the learned data in a memory device such as a built-in flush memory (not shown), and sends the data to the controller 10. At the time of the actual car operation posterior to the learning period, in the time zones of the operation modes (1) and (2), the charge and discharge control unit 19 alone provides each above-described control operation, based on the learned data stored in the control unit 19.

As it comes to a time zone that corresponds to the operation mode (3), the charge and discharge control unit 19 stops controlling the charge and discharge unit 15 and the voltage conversion unit 16, and thereafter comes into the standby state. In order to reduce to zero the standby power consumption of the electric power storage apparatus 9, the controller 10 subsequently opens the switch 21 to thereby interrupt power to the control power supply 20 that supplies the DC power to the control unit 19.

Based on the learned data sent beforehand from the charge and discharge control unit 19, the controller 10, when it comes to a time zone of the operation mode (3), opens the switch 21 to interrupt the power feed from the control power supply 13 to the charge and discharge control power supply 20, and thereby deactivates the operation of the storage apparatus 9 inclusive of the control unit 19, thus reducing to zero the standby power consumption of the storage apparatus 9. Further, when the time zone of the operation mode (3) ends, the controller 10 closes the switch 21 to start the power feed from the control power supply 13 to the control power supply 20, and normally activates the control unit 19. This allows the control unit 19 alone to provide the control operation in a time zone other than the operation mode (3).

Note that although a given unit period in an early time when the elevator is set up has been exemplified as a learning period, the invention is not limited to this example, and the learning may be done by providing a learning period when the flow of passenger varies because of the reason such as the change of tenant(s) in a building where the elevator has been set up.

According to the regenerative electric power storage control system for elevators, in the embodiment configured as above, the electric power charge and discharge control unit 19 calculates, on a time zone basis, electrical energy stored and discharged during a learning period, and determines, based on the calculation result, the operation mode for each time zone posterior to the learning period, and in a time zone where the unused electrical energy 26 inclusive of the energy loss due to self-discharge of the electric double-layer capacitor 14 has been calculated to increase, the energy of the EDLC 14 is supplied to the DC buses 11 and also to the electric power charge and discharge control power supply 20, and thereby energy to be lost through the self-discharge can be minimized to increase energy conservation effect.

REFERENCE NUMERALS

1 Electric motor
4 Car
7 Converter
8 Inverter
9 Electrical energy storage apparatus
11 DC buses
14 Electric double-layer capacitor
15 Electric power charge and discharge unit
16 Voltage conversion unit
19 Electric power charge and discharge control unit
20 Electric power charge and discharge control power supply
24 Stored electrical energy
25 Discharged electrical energy
27 Reference value

The invention claimed is:

1. A regenerative electric power storage control system for elevators, comprising:
 a converter that converts alternating current (AC) electric power to direct current (DC) electric power;
 an inverter that converts the DC electric power to variable voltage and variable frequency AC electric power, to drive an electric motor that causes an elevator car to ascend and descend;
 an electrical energy storage device provided, via an electric power charge and discharge unit, across DC buses located between the converter and the inverter, the energy storage device storing, during a regenerative operation of the car, DC energy that is supplied from the DC buses, and supplying, during a motoring operation of the car, to the DC buses the stored DC energy;
 an electric power charge and discharge control unit that calculates electrical energy that is stored during the regenerative operation of the car in the energy storage device, and electrical energy that is supplied from the energy storage device to the DC buses during the motoring operation of the car, and then controls the electric power charge and discharge unit;
 an electric power charge and discharge control power supply that supplies DC electric power to the charge and discharge control unit; and
 voltage conversion unit that supplies the DC energy stored in the energy storage device to the charge and discharge control power supply,
 wherein the charge and discharge control unit calculates, on a time zone basis, electrical energy stored in and electrical energy discharged from the energy storage device during a predetermined period, and in a time zone where after the predetermined period, a value derived by subtracting the discharged electrical energy of the energy storage device from the stored electrical energy thereof is a predetermined value or greater, the charge and discharge control unit supplies the DC energy stored in the energy storage device to the DC buses via the electric power charge and discharge unit and to the charge and discharge control power supply via the voltage conversion unit.

2. The regenerative electric power storage control system for elevators, of claim 1,
 wherein in a time zone where the stored electrical energy is a threshold value or greater and where a value derived by subtracting the discharged electrical energy from the stored electrical energy is the predetermined value or greater, the charge and discharge control unit supplies the DC energy stored in the energy storage device to the DC buses and the electric power charge and discharge control power supply,
 wherein in a time zone where the stored electrical energy is the threshold value or greater and where a value derived by subtracting the discharged electrical energy from the stored electrical energy is less than the predetermined value, the charge and discharge control unit supplies the DC energy stored in the energy storage device to the DC buses alone, out of the DC buses and the electric power charge and discharge control power supply, and wherein in a time zone where the stored electrical energy is less than the threshold value, the charge and discharge control unit does not supply the DC energy stored in the energy storage device to any of the DC buses and the charge and discharge control power supply.

3. The regenerative electric power storage control system for elevators, of claim 2, wherein the threshold value is a value derived by adding to power consumption of the charge and discharge control power supply, electrical energy to be lost because of a conversion performed by the voltage conversion unit.

4. The regenerative electric power storage control system for elevators, of claim 2, wherein the predetermined value is a value derived by adding to power consumption of the charge and discharge control power supply, electrical energy to be lost because of a conversion performed by the voltage conversion unit.

5. The regenerative electric power storage control system for elevators, of claim 3, wherein the predetermined value is a value derived by adding to power consumption of the charge and discharge control power supply, electrical energy to be lost because of a conversion performed by the voltage conversion unit.

6. The regenerative electric power storage control system for elevators, of claim 1, wherein an electric double-layer capacitor is used for the energy storage device.

7. The regenerative electric power storage control system for elevators, of claim 2, wherein an electric double-layer capacitor is used for the energy storage device.

8. The regenerative electric power storage control system for elevators, of claim 3, wherein an electric double-layer capacitor is used for the energy storage device.

9. The regenerative electric power storage control system for elevators, of claim 4, wherein an electric double-layer capacitor is used for the energy storage device.

10. The regenerative electric power storage control system for elevators, of claim 5, wherein an electric double-layer capacitor is used for the energy storage device.

* * * * *